Aug. 16, 1927.

F. H. SMITH 1,639,440

STEAM PLATEN

Filed June 21, 1926   2 Sheets-Sheet 1

INVENTOR
Frank H. Smith,
by
ATTORNEY

Aug. 16, 1927.

F. H. SMITH 1,639,440

STEAM PLATEN

Filed June 21, 1926 2 Sheets-Sheet 2

INVENTOR
Frank H. Smith,
by Murray C. Boyer
ATTORNEY

Patented Aug. 16, 1927.

1,639,440

UNITED STATES PATENT OFFICE.

FRANK H. SMITH, OF CLEVELAND, OHIO, ASSIGNOR TO SOUTHWARK FOUNDRY & MACHINE COMPANY, OF PHILADELPHIA, PENNSYLVANIA, A CORPORATION OF PENNSYLVANIA.

STEAM PLATEN.

Application filed June 21, 1926. Serial No. 117,539.

My invention relates to steam plates, or as they are called, platens, which are employed for curing rubber and composition goods, such platens being supported by and confined together in a suitable press, in order that articles of rubber and similar material disposed in suitable molds can be properly heated during the processes of manufacture, or for a curing or vulcanizing step.

The common practice in the use of these steam platens is to provide a series of the same which are suitably spaced apart and mounted in the press, between which platens the articles to be heated, vulcanized, or the like, properly confined in molds, are placed; suitable connections for steam or other heating fluid being provided and the press being so organized that the successive layers of platens and molds may be confined between the lower bed plate of the press and the head or top of the same during the heating operation.

In order that these plates or platens may be heated to the desired degree for the purpose intended, provision must be made for circulating steam or other heating medium through the interior of the same.

My present invention comprises a circular platen, and in order to provide means whereby steam or other heating medium may be circulated through the interior of the same, the improved platen forming the subject of my present invention is drilled radially from the outer margin or edge wall to a suitable depth, and the radial passages so provided are connected by passages disposed diagonally with respect thereto: preferably extending from the outer end of one radial passage to or adjacent to the inner end of the next adjacent radial passage, and such diagonally disposed connecting passages may be tangential to the arc of a circle struck from the axis of the circular plate. By preference, the platens are in the form of rings. The outer ends of the radial passages are closed, preferably by screw plugs and certain of the same have pipe connections in order that steam or other heating medium from a suitable source may be circulated through the same; the series of radial passages with the tangential connecting passages forming a continuous passage for the circulation of the heating medium.

It will be understood, of course, that a cooling liquid may be introduced into the platens for circulation through the continuous passages of the same, if desired. Suitable valves will be provided in the inlet and outlet connections for the steam or other heating fluid, (or a cooling medium), so that the heating of the platens is under complete control at all times.

These and other features of my invention are more fully described hereinafter; reference being had to the accompanying drawings, in which.

Figure 1:
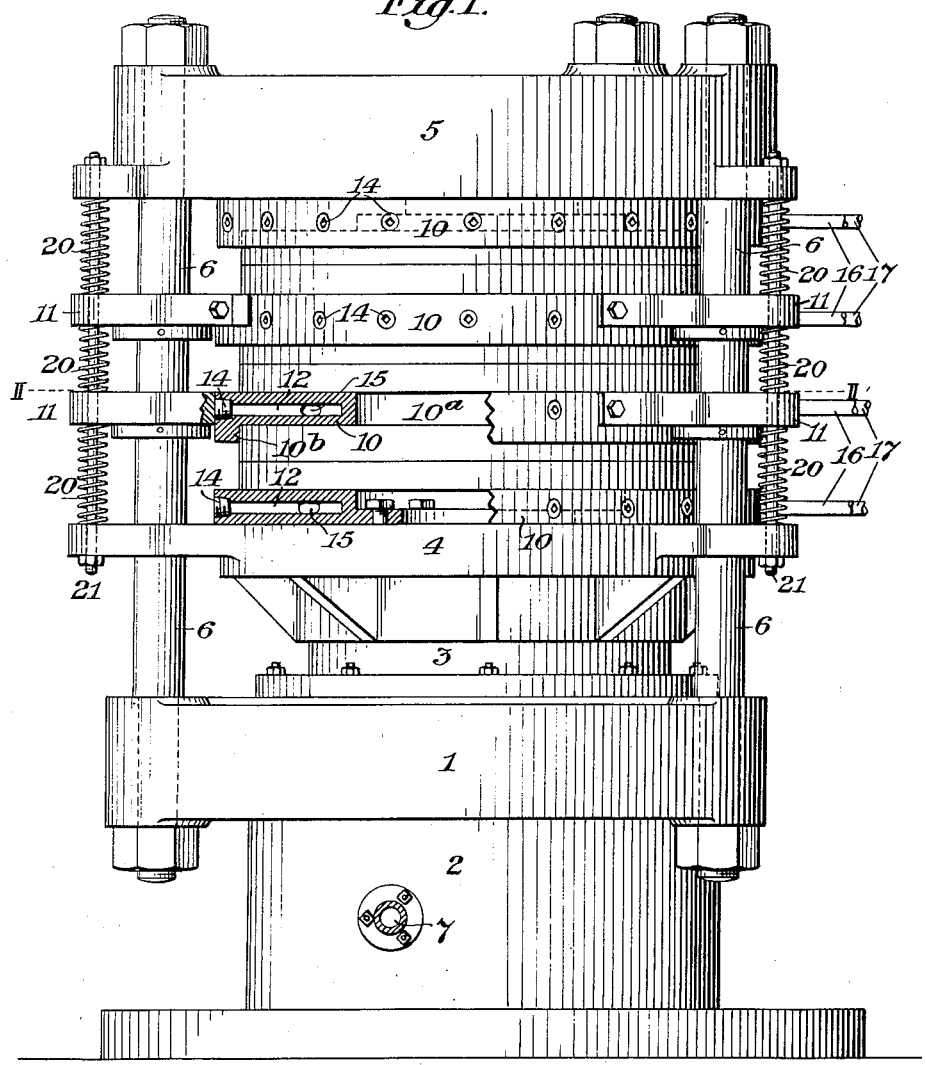
Figure 1 is a view in elevation, partly in section, of one form of press in which my improved platens may be employed.

In the drawings, 1 represents the base of a suitable press, provided with the usual hydraulic cylinder 2, having a plunger 3, which may carry at its upper end the movable press-platen 4. The upper fixed member, press-platen or cross-head, is indicated at 5, and tie rods 6 connect said base 1 with the upper member 5. Water to operate the press-platen 4, may be introduced through the inlet 7, from a suitable source.

The press is illustrated as carrying a series of hot plates or platens 10, preferably of ring form, which are vertically movable with respect to the press and are normally disposed in separated condition; those above the plate lying on the bed of the press being supported in a manner hereinafter described.

The several platens 10 are preferably provided with apertured guide lugs 11, adapted to the vertical rods 6, which connect the base of the press with the cross-head 5.

Figure 2:
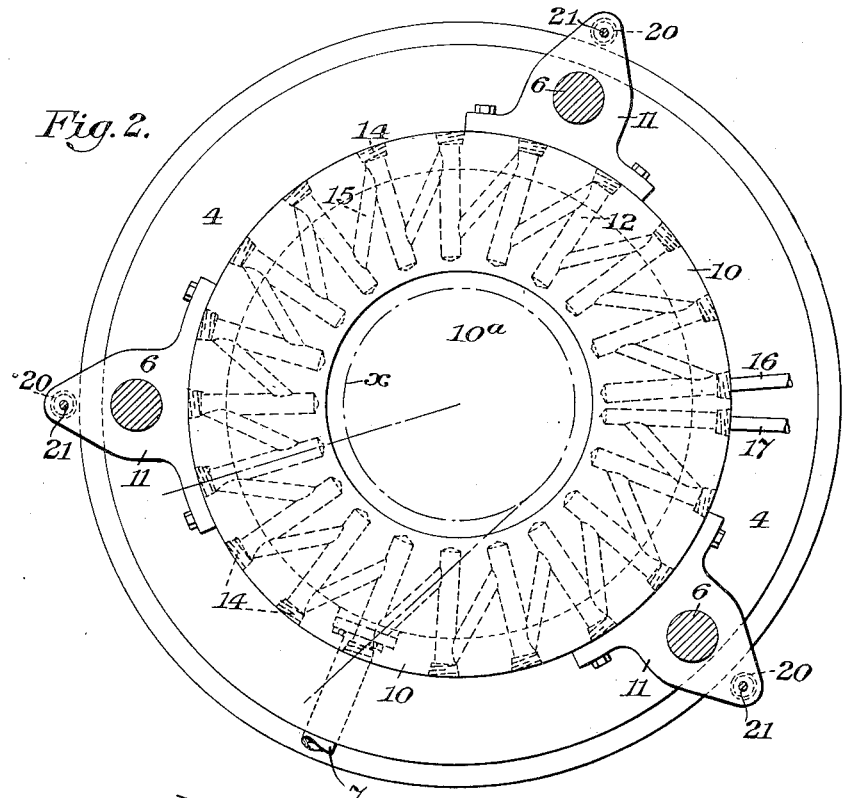
Figure 2 is a sectional plan view on the line II—II, Fig. 1.
Figure 3:
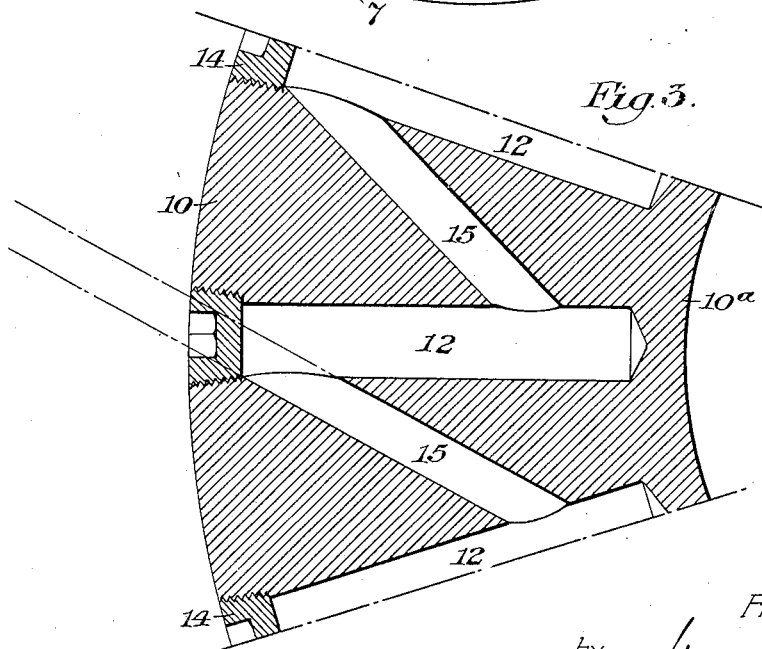
Fig. 3, is an enlarged view of a portion of the platen illustrated in Fig. 2, and Fig. 4, illustrates a modification within the scope of my invention.

The construction of the platens is clearly illustrated in Figs. 2 and 3, from which it will be noted that these platens are circular in contour, with a central opening for aperture 10ª. In order that a continuous passage may be formed in these platens, they are radially drilled at 12, and the outer ends of these radially drilled holes may be slightly enlarged and threaded for the reception of screw plugs 14.

In order that a continuous passage may be formed in the plate, each radial passage is connected to the adjacent one by a diagonally disposed passage 15; said diagonally disposed passages extending from a point near the outer end of one of the radial passages, to a point near the inner end of the next adjacent passage, and such passages 15, are preferably tangential to the arc of a circle struck from the axis and indicated at *x*.

The passages 15, which I have termed tangential passages, may be drilled after the radial passages 12 have been tapped to receive the screw plugs 14, closing the same.

To certain of the radial passages, pipes 16 and 17 are connected, pipe 16 providing for the inlet of steam or other heating medium from a suitable source to the continuous passage formed by the connecting radial and tangential portions thereof, while the pipe 17, provides an outlet for the steam and water of condensation, if any. These pipes may be connected to each of the platens by means of a suitable manifold or, if desired, the connection may be a continuous one by attaching the inlet pipe to the lower platen, with independent connections between this platen and the succeeding platens, with an outlet connection leading from the upper platen.

Figure 4:
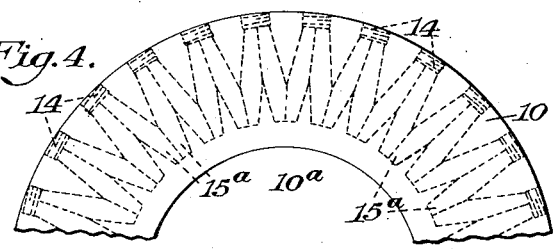

Instead of providing radial passages and connecting tangential passages, both sets of drilled passages may be tangential, as illustrated at 15ª, in Fig. 4.

The platens may be provided with a marginal depending flange 10ᵇ, at the outer edge of the same, which may serve to prevent lateral displacement of the molds.

By preference, the several platens are supported by collars carried by the tie-rods 6, and springs 20, which may be retained in position by the rods 21, passing through the ends of the guide lugs 11, are employed to assist in separating the platens after a curing operation; such springs being compressed when the press bed or platen 4 is raised.

I claim:

1. A disk-like heating platen having a continuous passage for the circulation of a heating medium, comprising a series of substantially radially disposed holes, and passages substantially tangential to the arc of a circle struck from the axis of said plate connecting said substantially radial holes.

2. A disk-like heating platen having a continuous passage for the circulation of a heating medium, comprising a series of radially disposed holes, and passages substantially tangential to the arc of a circle struck from the axis of said plate connecting said radial holes.

3. A disk-like heating platen having a continuous passage for the circulation of a heating medium, comprising a series of substantially radial holes, closures for the outer ends of said holes, and connecting passages diagonally disposed with respect to said substantially radial holes.

4. A steam plate comprising a disk of relatively large dimensions having an open center and having a series of substantially radial holes extending from the outer margin of said disk to a point adjacent the margin of the central aperture of the same, connecting passages disposed diagonally with respect to the substantially radial holes, and tubular connections connected to said steam plate and communicating with a plurality of adjacent substantially radial holes whereby a temperature controlling medium may be circulated through the continuous passage within the platen.

5. A steam plate comprising a disk of relatively large dimensions having an open center and having a series of radial holes extending from the outer margin of said disk to a point adjacent the margin of the central aperture of the same, connecting passages disposed diagonally with respect to the radial holes, and tubular valved connections connected to said steam plate and communicating with a plurality of adjacent radial holes whereby a temperature controlling medium may be circulated through the continuous passage within the platen.

6. A steam plate comprising a disk of relatively large dimensions having an open center and having a series of substantially radial holes extending from the outer margin of said disk to a point adjacent the margin of the central aperture of the same, plugs closing the outer ends of said holes, connecting passages disposed between the substantially radial holes and lying tangentially with respect to the arc of a circle struck from the axis of the steam plate, and tubular connections communicating with a plurality of such passages whereby a temperature controlling medium may be circulated through the continuous passage within the platen.

7. The combination with a press, of a series of disk-like platens, each having a continuous passage for the circulation of a temperature controlling medium, comprising a series of substantially radial holes and connecting passages diagonally disposed with respect to said substantially radial holes, and springs interposed between said platens.

8. A disk-like heating platen made from a solid plate and having a continuous passage for the circulation of a temperature controlling medium, comprising a plurality of bores communicating with each other and entering said platen from a marginal edge of the same.

9. A disk-like heating platen made from a solid plate and having a continuous passage for the circulation of a temperature controlling medium, comprising a plurality of bores entering said platen from the marginal edge of the same, and a second set of bores internally connecting the first named set.

10. A disk-like heating platen made from a solid plate and having a continuous passage for the circulation of a heating medium, comprising a series of bores disposed in the body of said platen and extending therein from a marginal edge or wall of the same, and means for closing the open ends of said bores.

11. A disk-like heating platen made from a solid plate and having a continuous passage for the circulation of a heating medium, comprising a series of bores disposed in the body of said platen and extending therein from a marginal edge or wall of the same, a second set of bores disposed between the first set and providing communication between the bores of the first named set, and means for closing the open ends of said bores.

12. The combination, with a press, of a series of disk-like platens each made from a solid plate and having a continuous passage for the circulation of a temperature controlling medium, wherein such passage is made up of a series of bores entering the body of said platen from a marginal edge or wall of the same and a second set of bores internally disposed between the bores of the first set.

In witness whereof I have signed this specification.

FRANK H. SMITH.